US009745870B2

(12) United States Patent
Johnson et al.

(10) Patent No.: US 9,745,870 B2
(45) Date of Patent: Aug. 29, 2017

(54) ORGANIC RANKINE CYCLE DECOMPRESSION HEAT ENGINE

(71) Applicant: Heat Source Energy Corp., Mountain Home, ID (US)

(72) Inventors: Keith Sterling Johnson, Salem, UT (US); Corey Jackson Newman, Sandy, UT (US)

(73) Assignee: Heat Source Energy Corp., Nampa, ID (US)

( * ) Notice: Subject to any disclaimer, the term of this patent is extended or adjusted under 35 U.S.C. 154(b) by 193 days.

(21) Appl. No.: 14/765,735

(22) PCT Filed: Feb. 5, 2014

(86) PCT No.: PCT/US2014/014965
§ 371 (c)(1),
(2) Date: Aug. 4, 2015

(87) PCT Pub. No.: WO2014/124061
PCT Pub. Date: Aug. 14, 2014

(65) Prior Publication Data
US 2015/0369086 A1    Dec. 24, 2015

Related U.S. Application Data

(60) Provisional application No. 61/761,115, filed on Feb. 5, 2013, provisional application No. 61/817,862, filed
(Continued)

(51) Int. Cl.
*F01K 25/04*    (2006.01)
*F01K 25/10*    (2006.01)
(Continued)

(52) U.S. Cl.
CPC .............. *F01K 25/04* (2013.01); *F01K 3/262* (2013.01); *F01K 7/36* (2013.01); *F01K 23/08* (2013.01);
(Continued)

(58) Field of Classification Search
CPC . F01K 25/04; F01K 7/36; F01K 23/08; F01K 3/262; F01K 25/10; F01K 25/103; Y02E 20/16
(Continued)

(56) References Cited

U.S. PATENT DOCUMENTS 7,637,108 B1    12/2009 Langson
2004/0216460 A1*  11/2004 Ruggieri ................. F01K 17/02
                                                        60/670
(Continued)

FOREIGN PATENT DOCUMENTS

DE    102010022408 A1    12/2011
WO    2007008225           1/2007
(Continued)

OTHER PUBLICATIONS

English Translation of RU 2435050 C2; published Nov. 27, 2011; Applicant: Obshchestvo S Ogranichennoj Otvetstvennost'Ju Tsentr Kortehs; 9 pgs.
(Continued)

*Primary Examiner* — Hoang Nguyen
(74) *Attorney, Agent, or Firm* — TraskBritt

(57) ABSTRACT

An improved heat engine that includes an organic refrigerant exhibiting a boiling point below −35° C.; a heat source having a temperature of less than 82° C.; a heat sink; a sealed, closed-loop path for the organic refrigerant, the sealed, closed-loop path having both a high-pressure zone that absorbs heat from the heat source, and a low-pressure zone that transfers heat to the heat sink; a positive-displace-
(Continued)

ment decompressor providing a pressure gradient through which the organic refrigerant in the gaseous phase flows continuously from the high-pressure zone to the low-pressure zone, the positive-displacement decompressor extracting mechanical energy due to the pressure gradient; and a positive-displacement hydraulic pump, which provides continuous flow of the organic refrigerant in the liquid phase from the low-pressure zone to the high-pressure zone, the hydraulic pump and the positive-displacement decompressor maintaining a pressure differential between the two zones of between about 20 to 42 bar.

10 Claims, 1 Drawing Sheet

Related U.S. Application Data on Apr. 30, 2013, provisional application No. 61/841,610, filed on Jul. 1, 2013.

(51) Int. Cl.
*F01K 23/08* (2006.01)
*F01K 3/26* (2006.01)
*F01K 7/36* (2006.01)

(52) U.S. Cl.
CPC ............ *F01K 25/10* (2013.01); *F01K 25/103* (2013.01); *Y02E 20/16* (2013.01)

(58) Field of Classification Search
USPC .................................................. 60/651, 671
See application file for complete search history.

(56) References Cited

U.S. PATENT DOCUMENTS

| | | | |
|---|---|---|---|
| 2006/0236698 A1 | 10/2006 | Langson | |
| 2007/0101735 A1* | 5/2007 | Matsui | F25B 9/06 |
| | | | 62/160 |
| 2010/0034684 A1 | 2/2010 | Ast et al. | |
| 2010/0058755 A1* | 3/2010 | Carter | F01C 1/0215 |
| | | | 60/515 |
| 2010/0212873 A1* | 8/2010 | Poole | F28F 13/003 |
| | | | 165/121 |
| 2011/0167818 A1 | 7/2011 | Tsuchino et al. | |
| 2012/0006023 A1 | 1/2012 | Johnson et al. | |
| 2012/0318001 A1* | 12/2012 | Takayama | F25B 1/10 |
| | | | 62/56 |
| 2013/0263598 A1 | 10/2013 | Almbauer et al. | |

FOREIGN PATENT DOCUMENTS

| | | |
|---|---|---|
| WO | 2011088041 | 7/2011 |
| WO | 2011151029 | 12/2011 |
| WO | 2014117156 A1 | 7/2014 |
| WO | 2014124061 | 8/2014 |

OTHER PUBLICATIONS

International Search Report; PCT/US2014/014965; dated Jun. 19, 2014; 2 pgs.
European Search Report for European Application No. 14749586.5 dated Oct. 5, 2016, 2 pages.
International Written Opinion for Internationsal Application No. PCT/US2014/014965; dated Jun. 19, 2014; 5 pgs.
International Preliminary Report on Patentability for International Application No. PCT/US2014/014965 dated Aug. 11, 2015, 3 pages.

* cited by examiner

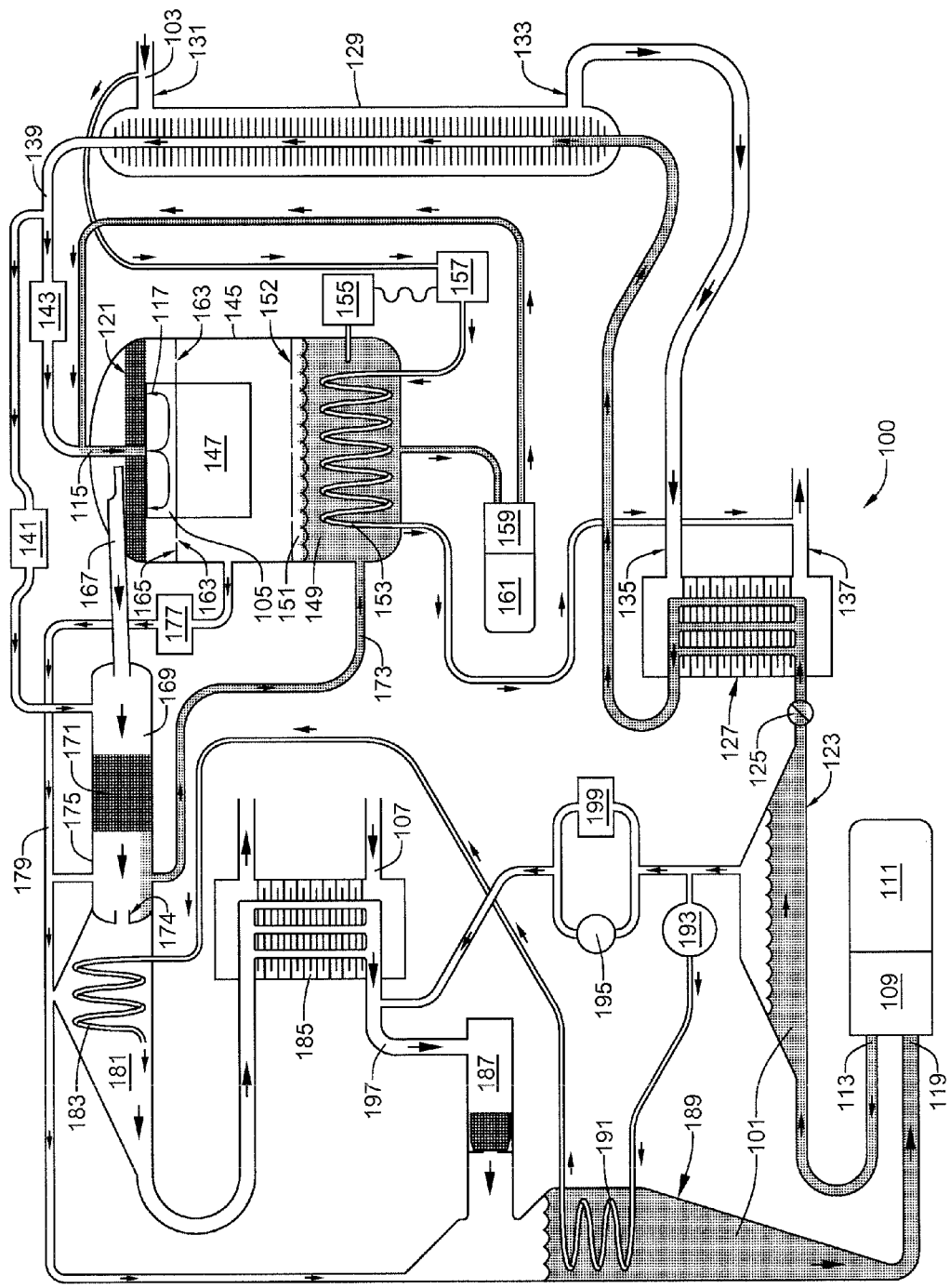

ORGANIC RANKINE CYCLE DECOMPRESSION HEAT ENGINE

CROSS-REFERENCE TO RELATED APPLICATIONS

This application is a national phase entry under 35 U.S.C. §371 of International Patent Application PCT/US2014/014965, filed Feb. 5, 2014, designating the United States of America and published in English as International Patent Publication WO 2014/124061 A1 on Aug. 14, 2014, which claims the benefit under Article 8 of the Patent Cooperation Treaty and under 35 U.S.C. §119(e) to U.S. Provisional Patent Application Ser. Nos. 61/841,610, filed Jul. 1, 2013, 61/817,862, filed Apr. 30, 2013, and 61/761,115, filed Feb. 5, 2013. The disclosures of each of these applications are hereby incorporated herein in their entireties by this reference.

TECHNICAL FIELD

This invention relates generally to organic Rankine cycle systems and, more particularly, to an improved heat engine that includes an organic refrigerant exhibiting a boiling point below −35° C.

BACKGROUND

The Rankine cycle is a thermodynamic cycle that converts heat into work. The heat is supplied externally to a closed loop, which usually uses water as the working fluid. This cycle generates about 80% of all electric power used throughout the world, and is used by virtually all solar, thermal, biomass, coal and nuclear power plants. It is named after William John Macquorn Rankine, a Scottish engineer and physicist (Jul. 5, 1820-Dec. 24, 1872). William Thomson (Lord Kelvin) and Rudolf Clausius were the founding contributors to the science of thermodynamics. Rankine developed a complete theory of the steam engine and, indeed, of all heat engines. His manuals of engineering science and practice were used for many decades after their publication in the 1850s and 1860s. He published several hundred papers and notes on science and engineering topics, from 1840 onward, and his interests were extremely varied, including, in his youth, botany, music theory and number theory, and, in his mature years, most major branches of science, mathematics and engineering. A Rankine cycle describes a model of a steam-operated forward heat engine most commonly found in power generation plants. The combustion of coal, natural gas and oil, as well as nuclear fission, commonly provides the heat for power plants employing the Rankine cycle. Rankine cycle power systems typically transform thermal energy into electrical energy. A conventional Rankine cycle power system employs the following four basic steps: (1) thermal energy is used, in a boiler, to turn water into steam; (2) the steam is sent through a turbine, which, in turn, drives an electric generator; (3) the steam is condensed back into water by discharging the remaining thermal energy in the steam to the environment; and (4) the condensate is pumped back to the boiler. In the ideal Rankine cycle, the expansion is isentropic and the evaporation and condensation processes are isobaric. However, the presence of irreversibilities in the real world lowers cycle efficiency. Those irreversibilities are primarily attributable to two factors.

The first is that during expansion of the gas, only a part of the energy recoverable from the pressure difference is transformed into useful work. The other part is converted into heat and is lost. The efficiency of the expander is stated as a percentage of work that would be performed by a theoretical isentropic expansion, in which entropy remains constant. The second cause is heat exchanger inefficiency caused by pressure drops associated with the long and sinuous paths that ensure good heat exchange, but lower the power recoverable from the cycle.

The efficiency of a Rankine cycle is a function of the physical properties of the working fluid. Without the pressure reaching super critical levels for the working fluid, the temperature range the cycle can operate over is quite small: turbine entry temperatures are typically 565° C. (the creep limit of stainless steel) and condenser temperatures are around 30° C. This gives a theoretical Carnot efficiency of about 63% compared with an actual efficiency of 42% for a modern coal-fired power station. This low turbine entry temperature (compared with an internal-combustion gas turbine) is why the Rankine cycle is often used as a bottoming cycle in combined cycle gas turbine power stations. The working fluid in a Rankine cycle follows a closed loop and is re-used continually. While many working fluids can and have been used in the Rankine cycle, water is usually the fluid of choice because it is abundant, inexpensive, nontoxic, generally non-reactive, and possesses favorable thermodynamic properties. Organic Rankine cycles have been developed to enable recovery of energy from lower temperature sources, such as industrial waste heat, geothermal heat, solar ponds, and so forth. The Organic Rankine cycle (ORC) is named for its use of an organic, high molecular mass fluid having a liquid-vapor phase change, or boiling point that occurs at a lower temperature than the water-steam phase change. Using the ORC, low-temperature heat can be converted to useful work, which, for example, can be harnessed to generate electricity. A prototype ORC power system was first developed and exhibited in 1961 by Israeli solar engineers Harry Zvi Tabor and Lucien Bronicki.

The organic Rankine cycle technology has many possible applications. Among them, the most widespread and promising fields are the following: waste heat recovery is the most important development field for the ORC. It can be applied to heat and power plants, or to industrial and farming processes such as organic products fermentation, hot exhausts from ovens or furnaces, flue gas condensation, exhaust gases from vehicles, intercooling of a compressor, and the condenser of a power cycle.

Biomass is available all over the world and can be used for the production of electricity on small to medium size scaled power plants. The problem of high specific investment costs for machinery such as steam boilers are overcome due to the low working pressures in ORC power plants. The ORC process also helps to overcome the relatively small amount of input fuel available in many regions because an efficient ORC power plant is possible for smaller sized plants.

Geothermic heat sources vary in temperature from 50° C. to 350° C. The ORC is, therefore, uniquely suited for this kind of application. However, it is important to keep in mind that for low-temperature geothermal sources (typically less than 100° C.), the efficiency is very low and depends strongly on heat sink temperature, which is typically the ambient temperature.

The ORC can also be used in the solar parabolic trough technology in place of the usual steam Rankine cycle. The ORC allows a lower collector temperature, a better collecting efficiency (reduced ambient losses) and, hence, the possibility of reducing the size of the solar field.

The selection of an appropriate working fluid is of key importance in low-temperature Rankine Cycles. Because of the low temperature, heat transfer inefficiencies are highly prejudicial. These inefficiencies depend very strongly on the thermodynamic characteristics of the fluid and on the operating conditions. In order to recover energy from low-grade heat sources, the working fluid must have a lower boiling temperature than water. Refrigerants and hydrocarbons are the two commonly used components. Unlike water, organic fluids usually suffer chemical deterioration and decomposition at high temperatures. The maximum hot source temperature is thus limited by the chemical stability of the working fluid. In addition, the freezing point should be lower than the lowest temperature in the cycle. A fluid with a high latent heat and density will absorb more energy from the source in the evaporator and thus reduce the required flow rate, the size of the facility, and energy consumption of the pump. Other important characteristics for an organic working fluid are that it has low ozone depletion and low global warming potential, that it be non-corrosive, non-flammable, non-toxic, in addition to being readily available at a reasonable cost.

On May 29, 2008, ElectraTherm, Inc. of Carson City, Nev. announced the successful installation of its first commercial waste heat generator at Southern Methodist University in Dallas, Tex. The generator, dubbed the "Green Machine," makes electricity from residual industrial heat that has, heretofore, gone to waste. The U.S. Department of Energy reports that the available seven quadrillion Btu of waste heat sources exceeds the current production of all other U.S. renewable power sources combined. This includes hydroelectric, wood, biofuels, geothermal, wind, and solar photovoltaic. With a scalable output of 50 kW-500 kW and a subsidy-free payback period of less than three years, ElectraTherm's creation has the potential to significantly expand the production of electricity at very low cost at every fossil fuel burning power plant without burning additional oil, gas or coal, and without further pollution or damage to the environment. From liquids having temperatures as low as 93 degrees C., the process extracts heat to run a twin-screw expander, which is coupled to a generator. The company's twin-screw expander, which costs about one-tenth the price of a turbine, operates free of expensive gear boxes and electronics, runs at one-tenth the speed of turbines, operates with far less friction than does a turbine, and utilizes process lubrication without the need for a traditional oil pump, oil tank, oil lines and oil filter, enables the Green Machine to produce electricity at a cost of $0.03 to $0.04 per kW/hr during the payback period and for less than $0.01 per kW/hr thereafter. Although U.S. patent application Ser. No. 11/407,555, titled Waste Heat Recovery Generator, was filed by inventor Richard K. Langson on Apr. 19, 2006, covering the generator process and apparatus, with a priority date based on the filing of Provisional Patent Application No. 60/673,543, the application was finally rejected for obviousness in December of 2007. Langson also subsequently filed a related application titled Power Compounder, which covers certain aspects of the invention, and which issued as U.S. Pat. No. 7,637,108.

BRIEF SUMMARY

A heat engine employing an organic Rankine cycle includes: an organic refrigerant having a boiling point below −35 degrees Celsius; a hot water heat source having a temperature of less than 82 degrees Celsius; a heat sink; a sealed, closed-loop path for the organic refrigerant, the path having both a high-pressure zone that absorbs heat from the heat source, and that contains a first portion of the organic refrigerant in at least a gaseous phase, and a low-pressure zone that transfers heat to the heat sink, and that contains a second portion of the organic refrigerant in at least a liquid phase; a positive-displacement decompressor that provides a pressure gradient through which the organic refrigerant in its gaseous phase flows continuously from the high-pressure zone to the low-pressure zone, the decompressor maintaining a pressure differential between those zones of between about 20 bar and about 42 bar, the decompressor extracting mechanical energy from the pressure gradient; an electrical generator coupled to the decompressor that converts extracted mechanical energy to electrical energy; and a positive-displacement hydraulic pump for providing continuous flow of the organic refrigerant in its liquid phase from the low-pressure zone to the high-pressure zone.

The improved decompression heat engine utilizes a Rankine cycle having two multiphase differential pressure zones separated by both a positive-displacement decompressor and a positive-displacement hydraulic pump. The positive-displacement decompressor decompresses a heated organic refrigerant from a high-pressure vapor state to a lower pressure vapor state, thereby creating mechanical work. The positive-displacement decompressor reaches its maximum power potential when pressure is released by continuous flow without pistons or valves interrupting the flow.

While related to a conventional Organic Rankine Cycle (ORC), the improved organic Rankine cycle decompression heat engine differs because it focuses primarily on energy derived from differential pressure (Delta P) energy rather than the conventional ORC focus on high-velocity mass flow rate through an expander with a high Delta T.

The improved heat engine is used primarily to generate electricity from a heat source having a temperature less than 82 degrees Celsius. Because energy could heretofore not be economically extracted from such heat sources, they were largely ignored. The heat source can range from low-temperature natural geothermal heat like hot springs, waste heat from methane generators, manufacturing or any heat source or waste heat source available.

The improved heat engine has the ability to capture very low heat energy more abundantly available (below 82 degrees Celsius) and transfer that energy into electricity more efficiently than currently available technology. Such energy is extracted by using a very low boiling point refrigerant (such as R410a, which boils at approximately −51 degrees C.) and transforming high differential pressure of from about 20 to 42 bar into electricity generation through a positive-displacement decompressor.

Cooling sources provide a low-pressure zone in the improved heat engine by sinking heat to abundant cold streams and waterways, or even to the ambient air. Abundant lower heat and cooling sources will be utilized by the heat engine like never before, allowing more clean renewable energy to be available to the world.

A brief comparison of a conventional organic Rankine cycle (ORC) to the improved decompression heat engine is in order. The conventional ORC is a cycle that utilizes a heat source and a cooling source to operate a type of heat engine to produce mechanical work at a given Delta T. Because of the high mass flow requirements of an ORC, it is limited in the use of working fluids/refrigerants. A conventional ORC utilizes a high-velocity vapor phase change in the working fluid at a relatively low pressure to produce mechanical work. At a typical ORC low-heat temperature (about 93° C. to about 149° C.), R245a will flash or go through a vapor phase change and return back to a liquid phase at close to ambient temperatures (approximately 21° C.). During this phase change, the pressure differential ranges from approximately 0.69 bar to 1.38 bar at about 12.8° C. to 21° C. on the cool side and approximately 10.9 bar to 13.8 bar at about 93° C. to 149° C. on the hot side. The force to achieve mechanical work is a high-velocity/CFM vapor mass flow rate before the expander/driver at approximately 6.9 bar to 13.8 bar. Thus, relatively low pressure at a high CFM achieve the mechanical work from an ORC heat engine. The working fluid in an ORC must flow at a high rate through the heat exchange process to transfer heat to and from a high flowing refrigerant/working fluid, thus requiring excessive BTU to KW performance. The prime mover in an ORC is designed to provide resistance to a high-mass, high-velocity vapor force, but is not positive displacement because a positive-displacement prime mover can compress vapor to a fluid at its inlet and slow down the driver. Similar to a wind turbine blade, wind velocity must pass by the blade/driver to provide enough resistance to rotate the blade/driver. ORC prime movers/expanders allow the vapor to effectively expand through the impeller vanes in order to capture enough blow-by CFM force at low pressure to achieve mechanical work. An ORC works best at as high a temperature difference as possible (high Delta T).

The improved heat engine is related to a conventional ORC in that the former utilizes a heat source and a cooling source to operate a type of heat engine to produce mechanical work. While the two cycles are related, the improved heat engine is uniquely different. The decompressor for the improved heat engine is a positive-displacement device, and utilizes a lower flow/CFM higher pressure principle. High-pressure super-heated vapor (working fluid) at approximately 41.4 bar at 65.6° C. entering the positive-displacement prime mover, will decompress to approximately 13.8 bar at 21° C. lower pressure vapor and convert 27.6 bar differential pressure (Delta P) energy into mechanical work, as an example. This differential pressure energy function is similar to a refrigerant compressor operating in reverse. While a compressor that can move 105 kw of heat may require a 62 kw electrical motor to compress a refrigerant to a 41.4 bar high-pressure vapor at 65.6° C., the improved heat engine may generate more than 62 kw of power when 65.6° C. of heated compressed high-pressure refrigerant is forcing the compressor process in the opposite direction. The waste heat energy, for example, is the energy force driving the reverse compressor process to generate electricity rather than electricity being the force to compress a cool vapor/gas to a hot vapor/gas.

The Improved ORC Compared to a Typical ORC

By focusing on pressure differential (Delta P) energy when using very low-boiling point, high-pressure refrigerants, a smaller Delta T can be used to achieve an equivalent differential pressure (Delta P). The extractable energy using the improved ORC with 27.6 bar pressure differential is much greater than the energy that can be extracted using a conventional ORC with a 9.65 bar energy pressure differential.

ORC Refrigerant R245fa Temperature-Pressure Delta T and Delta P
21° C.=1.2 bar 93° C.=10.9 bar
Delta T of 72° C.=Delta P of 9.7 bar energy
HEDC Refrigerant R407c Temperature-Pressure Delta T and Delta P
21° C.=9.6 bar 78° C.=37.5 bar
Delta T of 57° C.=Delta P of 27.9 bar energy
HEDC Refrigerant R410a Temperature-Pressure Delta T and Delta P
21° C.=13.8 bar 66° C.=41.4 bar
Delta T of 45° C.=Delta P of 27.6 bar energy
HEDC Refrigerant $CO_2$ Temperature-Pressure Delta T and Delta P
20° C.=57.4 bar 38° C.=85.4 bar
Delta T of 18° C.=Delta P of 28.0 bar energy

BRIEF DESCRIPTION OF THE DRAWINGS

FIG. 1 is a schematic diagram of the improved organic Rankine cycle decompression heat engine.

DETAILED DESCRIPTION

The present application has priority dates that are based on the filing of three separate provisional patent applications. The first, application Ser. No. 61/761,115, has a filing date of 5 Feb. 2013 and is titled HEAT ENGINE DECOMPRESSION CYCLE. The second, application Ser. No. 61/817,862, has a filing date of 30 Apr. 2013 and is titled HIGH-PRESSURE VAPOR ENHANCER. The third, application Ser. No. 61/841,610, has a filing date of 1 Jul. 2013 and is titled SCROLL DRIVER ACCELERATOR SYSTEM. All three of these provisional patent applications are hereby fully incorporated herein, in their entireties, by this reference.

The invention will now be described with reference to FIG. 1, which shows the ordered arrangement of equipment required to implement the improved organic Rankine cycle decompression heat engine 100. The improved heat engine 100, which employs a highly specialized organic Rankine cycle, provides a sealed, closed-loop path for an organic refrigerant 101 having a boiling point below −35 degrees Celsius. Elements of the closed-loop path will be subsequently enumerated. The improved heat engine 100 also includes a low-grade fluid heat source 103 having a temperature of less than 82 degrees Celsius. In almost all cases, it is preferable that the fluid heat source 103 be a hot water heat source, as rapid heat transfer is possible due to the high specific heat of water (1 calorie/gram ° C.=4.186 joule/gram ° C.), which is higher than any other common substance. Such low-grade heat sources are extremely plentiful. They can, for example, be geothermal water, coolant water from nuclear reactors or from industrial processes, and many other sources that have, heretofore, been considered of too low temperature to be useful in an energy recovery process. It is also certainly conceivable that the fluid heat source 103 could be hot gases. However, such a scenario would require a much larger heat exchanger than would be required for a hot water source.

A primary difference between the improved heat engine 100 of the present invention and previously disclosed heat engines employing conventional organic Rankine cycles is the use, in this heat engine, of organic refrigerants having very low molecular weight and very low boiling points. In essence, the improved heat engine 100 is effective because of it is ability to maintain a relatively high pressure differential of between about 20 to 42 bar on opposite sides of a highly efficient positive-displacement decompressor 105. In an embodiment of the improved heat engine 100, an orbital scroll decompressor is manufactured by the Danish company, Danfoss. Orbital scroll compressors (modified for use as decompressors) of other manufacturers, such as Trane, Copeland, Emerson Electric and Bristol, could also be used. In addition, other types of positive-displacement decompressors can be substituted for an orbital scroll decompressor. For example, Roots-type pumps, starrotor pumps, and dual-lobe pumps can almost certainly be used with success. In any case, the use of a highly efficient positive-displacement decompressor 105 enables the improved heat engine 100 to be used to generate electrical power from low-grade heat sources that have been heretofore ignored. The improved heat engine 100 also includes a heat sink 107, which is at a temperature that is less than or equal to the ambient temperature. Though the heat sink 107 is, ideally, a fluid cold water source, as from a well or pond that is at less than ambient temperature, a heat sink using ambient air can be employed, but with a resulting drop in efficiency of the heat engine 100.

Another component of the improved heat engine 100 that is critical to maintaining the pressure differential of between about 20 to 42 bar on opposite sides of the decompressor is a positive-displacement hydraulic pump 109. The sole function of the hydraulic pump 109, which is operated by a first electric motor 111, is to transfer the refrigerant 101, in its liquid state, from a low-pressure zone to a high-pressure zone. In such capacity, the hydraulic pump 109 must move the liquid refrigerant 101 while matching the pressure in the high-pressure zone. From the output port 113 of the hydraulic pump 109 to the intake port 115 of the decompressor 105, the organic refrigerant 101 travels in the high-pressure zone of the heat engine 100. Likewise, from the exhaust ports 117 of the decompressor 105 to the input port 119 of the hydraulic pump 109, the organic refrigerant 101 travels in the low-pressure zone of the heat engine 100. As a matter of clarification, it should be mentioned that the arrowheads near the outer edges of the rectangular block that represents the decompressor 105 symbolize the exhaust ports, as well as their relative location and direction. It will be noted that the exhaust ports 117 are covered by a first porous oil separator 121.

Still referring to FIG. 1, from the output port 113 of the hydraulic pump 109, the organic refrigerant 101, generally in its liquid state, enters an eccentrically shaped cool refrigerant pressure holding tank 123. Because of the shape of holding tank 123, sufficient refrigerant vapor becomes trapped in the holding tank 123 so that it can serve as a pulsation dampener to mitigate the effect of fluid hammer as the hydraulic pump 109 transfers refrigerant from the low-pressure zone to the high-pressure zone. From the holding tank 123, the refrigerant flows through a check valve 125 en route to a refrigerant-heating heat exchanger 127. From the refrigerant-heating heat exchanger 127, the refrigerant flows to a high-pressure vapor enhancer 129, which is, essentially, a vertically oriented, tubular, fin-tube heat exchanger. It will be noted that hot water from the hot water heat source 103 enters near the top of the high-pressure vapor enhancer 129 through hot water input port 131 and exits near the bottom thereof through hot water output port 133, while refrigerant enters the bottom of the high-pressure vapor enhancer 129 and exits the top thereof. The high-pressure vapor enhancer 129 ensures that refrigerant 101, as it passes therethrough, is flashed to a superheated vapor, in which state it travels to the intake port 115 of the decompressor 105. Piping 139 is sized to maintain this high-pressure vapor state. After hot water from the heat source 103 leaves output port 133, it is piped to a hot water entry port 135 near the top of refrigerant-heating heat exchanger 127. After heat is transferred to the organic refrigerant 101, it leaves the refrigerant-heating heat exchanger 127 through hot water exit port 137. A first actuator valve 141 serves as a pressure relief valve for superheated refrigerant vapor leaving the high-pressure vapor enhancer 129. In such a pressure-limiting capacity, the first actuator valve 141 directs excess heat to the low-pressure zone, and also serves as bypass valve for pre-start and post-run operation. A second actuator valve 143 controls the pressure of superheated refrigerant vapor entering the decompressor 105.

Still referring to FIG. 1, the decompressor 105 is located within a prime mover shell 145, which also houses a high-efficiency generator 147 that is mechanically coupled to the positive-displacement decompressor 105. Lubricating oil 149 is held in a reservoir 151 that is separated from the generator 147 by a heat shield 152 that has some small apertures therein, which enable oil to drain into the reservoir 151. The lubricating oil 149 held in reservoir 151 is heated by a hot water loop 153 that begins at the hot water input port 131 of the high-pressure vapor enhancer 129 and ends at the hot water exit port 137 of the refrigerant-heating heat exchanger 127. The lubricating oil temperature in reservoir 151 is controlled by a thermostat 155 and flow control solenoid 157. The lubricating oil 149 is circulated by oil pump 159 powered by a second electric motor 161 and is injected into the intake port 115 of the decompressor 105. The primary functions of the lubricating oil 149 are to lubricate and help seal minute gaps between the stationary scroll and the orbital scroll of the decompressor 105, thereby enhancing the efficiency of the decompressor 105. Alternatively, the lubricating oil 149 can be circulated by an internal oil pump within the drive shaft of the positive-displacement decompressor 105. After refrigerant vapor has escaped the exhaust ports 117 of the decompressor 105, it enters the low-pressure zone and passes through the first porous oil separator 121, which removes most of the lubricating oil from the refrigerant vapor. The removed oil passes through apertures 163 in an exhaust gas barrier ring 165 and then drains through the heat shield 152 into the oil reservoir 151. The refrigerant vapor then enters exhaust pipe 167 and travels to a vapor expansion chamber 169, which contains a second porous oil separator 171. Oil removed from the refrigerant vapor by oil separator 171 returns, via gravity, to the oil reservoir 151 through return tube 173. It will be noted that the vapor expansion chamber 169 has an output tube 174 that extends into the chamber housing 175, thereby making it more difficult for oil to escape from the expansion chamber 169 through the normal refrigerant escape path. Cooling of the generator 147, along with pressure equalization for the prime mover shell 145, is achieved with an actuator valve 177 and pressure equalization piping 179 from the prime mover shell 145 to the top of the chamber housing 175.

Still referring to FIG. 1, from the vapor expansion chamber 169, refrigerant vapor passes into an eccentrically shaped expansion chamber extension 181, which is also connected at its apex to the pressure equalization piping 179. It will be noted that there is a first sub-cooling coil 183 within the expansion chamber extension 181. It will be further noted that the first sub-cooling coil 183 vents into the expansion chamber extension, where the escaping gas from the coil 183 join the refrigerant vapor that has been released from the decompressor 105. Because of the expansion and cooling effect, the refrigerant vapor begins to condense into a liquid. It should be understood that the propensity of the refrigerant vapor to condense is directly related to the amount of liquid refrigerant charge maintained in the low pressure zone. From the expansion chamber extension 181, the condensing vapor moves to a refrigerant-cooling heat exchanger 185, where heat from the refrigerant is transferred to the heat sink 107, which is preferably a cold-water source.

From the refrigerant-cooling heat exchanger 185, the condensing refrigerant vapor passes through a filter/dryer unit 187, which removes any water moisture and any solid particles from the condensing refrigerant. From the filter/dryer unit 187, the largely condensed refrigerant 101 enters a vertically oriented refrigerant tank 189 of downwardly tapering and downwardly decreasing cross-sectional area, which employs gravity to ensure maximum density of refrigerant 101 in its liquid state as it enters the input port 119 of the hydraulic pump 109. It will be noted that the vertically oriented refrigerant tank 189 is also connected to the pressure equalization piping 179. It will be further noted that a second sub-cooling coil 191, which is installed within refrigerant tank 189, can be used to further cool the condensed refrigerant before it enters the hydraulic pump 109. A metering valve 193 provides a pressure drop for either pressurized liquid or vapor stored within holding tank 123. This released liquid or vapor passes, first, through the second sub-cooling coil 191, and subsequently, through the first sub-cooling coil 183, thereby assisting in the condensation and cooling of the refrigerant vapor in the expansion chamber extension 181 and liquid refrigerant in the vertically oriented refrigerant tank 189.

Still referring to FIG. 1, a mechanical pressure relief valve 195 protects the high-pressure zone from incidental or inadvertent over-pressure events. Released vapor and/or liquid refrigerant is released to the input port 197 of the filter/dryer unit 187. In addition, an actuator valve 199 allows controlled pressure relief for system pre-start in order to purge any refrigerant vapor from the hydraulic pump 109. Once again, released vapor and/or liquid refrigerant is released to the input port 197 of the filter/dryer unit 187.

Although only a single embodiment of the improved organic Rankine cycle decompression heat engine has been shown and described, it will be obvious to those having ordinary skill in the art that changes and modifications may be made thereto without departing from the scope and the spirit of the invention as hereinafter claimed.

What is claimed is:

1. A heat engine employing an organic Rankine cycle comprising:
   an organic refrigerant exhibiting a boiling point below −35 degrees Celsius;
   a hot water heat source having a temperature of less than 82 degrees Celsius;
   a heat sink;
   a sealed, closed-loop path for the organic refrigerant, the sealed, closed-loop path having both a high-pressure zone configured to absorb heat from the hot water heat source, and which contains a first portion of the organic refrigerant in at least a gaseous phase, and a low-pressure zone which transfers configured to transfer heat to the heat sink, and which contains a second portion of the organic refrigerant in at least a liquid phase;
   a positive-displacement decompressor configured to provide a pressure gradient through which the organic refrigerant in the gaseous phase is configured to flow continuously from the high-pressure zone to the low-pressure zone, the positive-displacement decompressor maintaining a pressure differential between the high-pressure zone and the low-pressure zone of between about 20 bar and about 42 bar, the positive-displacement decompressor extracting mechanical energy due to the pressure gradient;
   an electrical generator coupled to the positive-displacement decompressor configured to convert extracted mechanical energy to electrical energy; and
   a positive displacement hydraulic pump for providing continuous flow of the organic refrigerant in the liquid phase from the low-pressure zone to the high-pressure zone.

2. The heat engine of claim 1, further comprising a lubricating oil that is generally immiscible with the organic refrigerant, wherein the lubricating oil is configured to circulate through the sealed, closed-loop path and perform sealing lubrication functions in the positive-displacement decompressor.

3. The heat engine of claim 1, wherein the positive-displacement decompressor is selected from the group consisting of orbital-scroll, Roots, starrotor, and dual-lobe pumps.

4. The heat engine of claim 1, further comprising an eccentrically shaped refrigerant holding tank configured to serve as a pulsation dampener to mitigate the effect of fluid hammer as the positive-displacement hydraulic pump transfers the organic refrigerant from the low-pressure zone to the high-pressure zone.

5. The heat engine of claim 1, wherein the organic refrigerant exhibits a boiling point below −40 degrees Celsius.

6. The heat engine of claim 1, wherein the organic refrigerant exhibits a boiling point below −45 degrees Celsius.

7. The heat engine of claim 1, further comprising a vertically oriented refrigerant tank of downwardly tapering and downwardly decreasing cross-sectional area, wherein the vertically oriented refrigerant tank is configured to employ gravity to ensure maximum density of the organic refrigerant in the liquid phase as the organic refrigerant enters the positive-displacement hydraulic pump.

8. The heat engine of claim 1, wherein the high-pressure zone comprises a vertically oriented tubular heat exchanger having an entrance for water from the hot water heat source in an upper portion thereof and an exit for the water from the hot water heat source in a lower portion thereof, an entrance for the organic refrigerant in the gaseous phase in the lower portion thereof and an exit for the organic refrigerant in the gaseous phase in the upper portion thereof, wherein the organic refrigerant in the gaseous phase exiting the vertically oriented tubular heat exchanger is configured to directly enter an input of the positive-displacement decompressor, the vertically oriented tubular heat exchanger configured to create a temperature gradient assisted by gravity.

9. The heat engine of claim 1, further comprising at least two oil separators positioned in series to extract oil from the organic refrigerant in the gaseous phase.

10. The heat engine of claim 1, further comprising at least one refrigeration coil within the low-pressure zone, the at least one refrigeration coil configured to receive cool, pressurized organic refrigerant from the high-pressure zone before the organic refrigerant is heated from the hot water heat source.

* * * * *

UNITED STATES PATENT AND TRADEMARK OFFICE
CERTIFICATE OF CORRECTION

PATENT NO. : 9,745,870 B2  
APPLICATION NO. : 14/765735  
DATED : August 29, 2017  
INVENTOR(S) : Keith Sterling Johnson and Corey Jackson Newman It is certified that error appears in the above-identified patent and that said Letters Patent is hereby corrected as shown below:

In the Claims

Claim 1, Column 9, Line 52, change "which transfers configured to" to --configured to--

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*